No. 892,015. PATENTED JUNE 30, 1908.
W. C. SMITH.
ANIMAL TRAP.
APPLICATION FILED NOV. 19, 1907.
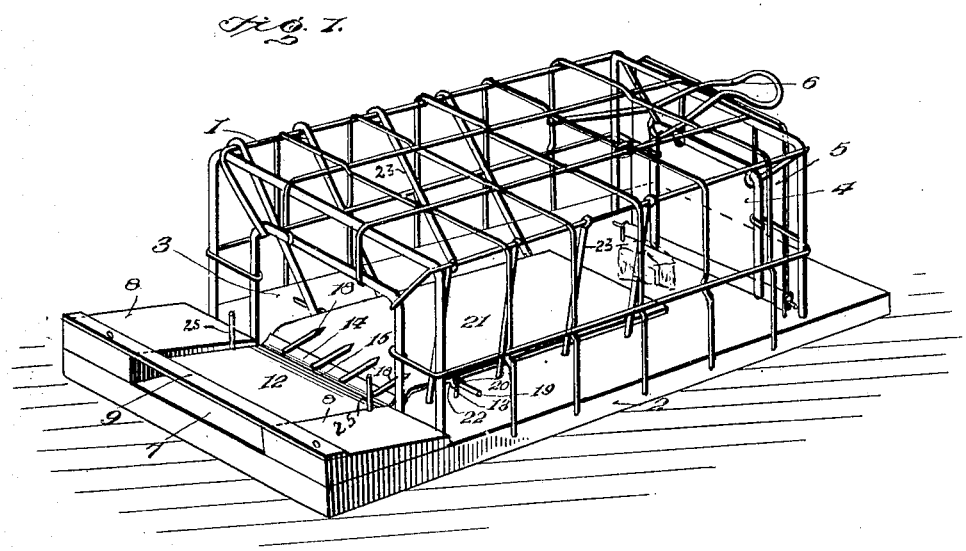
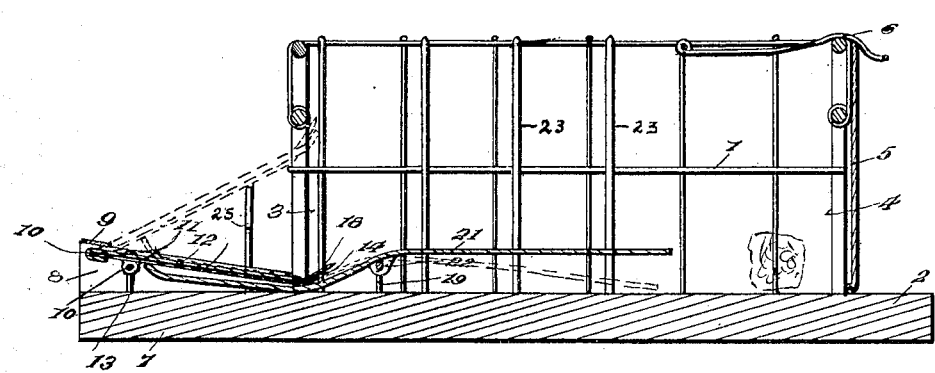
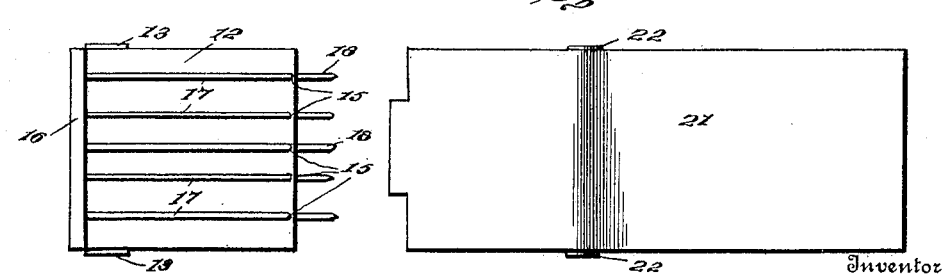

UNITED STATES PATENT OFFICE.

WILLIAM C. SMITH, OF NORRIS CITY, ILLINOIS.

ANIMAL-TRAP.

No. 892,015.  Specification of Letters Patent.  Patented June 30, 1908.

Application filed November 19, 1907. Serial No. 402,841.

*To all whom it may concern:*

Be it known that I, WILLIAM C. SMITH, citizen of the United States, residing at Norris City, in the county of White and State of Illinois, have invented certain new and useful Improvements in Animal-Traps, of which the following is a specification.

This invention contemplates certain new and useful improvements in animal traps and the object of the invention is an improved construction of trap which is so arranged that the animal will close the door after it upon going into the cage and will also close the door before it upon an attempt to retrace his steps to escape from the cage.

With this and other objects in view as will more fully appear as the description proceeds, the invention consists in certain constructions and arrangements of parts that I shall hereinafter fully describe and claim.

For a full understanding of the invention and the merits thereof, reference is to be had to the following description and accompanying drawing, in which:

Figure 1 is a perspective view of my improved animal trap. Fig. 2 is a longitudinal section thereof showing in dotted lines the rocked position of the actuating lever and the consequent inclination of the door plate, and Fig. 3 is a bottom plan view of the door plate and the actuating lever respectively.

Corresponding and like parts are referred to in the following description and indicated in all the views of the drawing by the same reference characters.

My improved trap comprises a wire cage 1 which is mounted on a base 2 and which is provided at its front and rear ends respectively with an entrance opening 3 and an exit opening 4. The said exit opening 4 is normally closed by a door 5 designed to be held in closed position by a spring latch 6 secured to the cage and adapted to engage the free end of said door. The base 2 of the cage is extended forwardly as shown to form a porch 7 across the front end of the cage. Two blocks 8 are secured to the porch 7, one on each side of the entrance opening 2, said blocks preferably sloping from their outer ends downwardly toward the front of the cage. A guard strip 9 is secured at each end to the outer ends of the blocks 8 and extends therebetween. A rod 10 is mounted at each end in an eye 11 and extends between the blocks 7 contiguous to the guard strip 9. A door plate 12 is pivotally mounted near one end upon the rod 10 by means of two ears 13 formed one on each side of the door plate, and through which the said rod passes, the other or free end of the door plate extending within the entrance opening 3 and being upturned as indicated at 14 and formed with a series of apertures 15. The pivoted end of the door plate is returned downwardly as indicated at 16 and a plurality of wires 17 are clenched at one end in the said returned portion, said wires extending over the rod 10, backwardly beneath the door plate and parallel to each other. The other ends of the wires 17 protrude through the respective apertures 15 and form a series of prongs 18. These prongs are inclined backwardly, resting throughout part of their length upon the upturned extremity 14, and are formed with their extremities tapered to a point.

A pintle 19 is mounted near each end in an eye 20, and extends transversely within the cage 1 near the front end thereof An actuating lever 21 which is in the form of a plate or strip preferably as wide as the door plate 12, is fulcrumed intermediate of its ends, on the pintle 19 by means of two ears 22 formed on opposite sides of the lever 21 and through which said pintle passes. The forward arm of this lever is bent downwardly and extends beneath the door plate 12, being normally depressed by the weight thereof. The rear arm of such lever extends backwardly toward the rear of the cage and is normally held in an elevated position by the depression of the front arm.

Bars 23 are provided within the cage contiguous to each side of the rear arm of the lever 22 and form a runway which requires that an animal, after passing over the door plate 12 and through the entrance opening 2 of the cage, must walk over the raised rear arm of the said lever. The weight of the animal on the said rear arm, depresses the latter and rocks the lever 22 to incline the door plate 12 upwardly with the prongs 18 of the free end thereof resting against the top of the entrance opening 3, thus substantially closing the said entrance. Since the animal must pass through the runway 24 and hence over the rear arm of the lever 22 to retrace his steps, he will in every case rock said lever to close the entrance opening 3 of the cage before him and prevent his escape therefrom.

In order to prevent the possible escape of the captured animal through either of the spaces formed by the upward inclination of the door plate 12 and vertical bars 25 are secured in the porch 7, one or more on each side of the entrance opening and contiguous to the corresponding sides of the door plate 12. The door 5 is designed to be opened so as to permit the removal of the captured animal from the cage through the exit opening 4 thereof.

From the above description in connection with the accompanying drawings, it will be seen that I have provided a simple, durable and efficient construction of animal trap in the operation of which the animal in attempting to obtain the bait placed within the cage, passes over the door plate, through the entrance opening and upon the raised rear arm of the actuating lever, its weight upon said arm rocking the lever to cause the door plate to close the entrance opening after it. Any attempt of the animal to retrace its steps to escape from the cage, rocks the lever to cause the entrance opening to be closed before it.

Having thus described the invention, what I claim is:

1. The herein-described trap comprising a cage having an entrance opening, a door plate fulcrumed at one end in front of the entrance opening with the other or free end extending therein and being upturned and provided with apertures, the fulcrumed end of the door plate being returned upon itself, wires clenched at one end in the returned portion and extending beneath the door plate, said wires protruding through the respective apertures and forming a series of prongs, and an actuating lever fulcrumed in the cage with its forward arm extending beneath the door plate and being depressed thereby, the rear arm of said lever being elevated and adapted to be depressed to rock said lever as and for the purpose set forth.

2. The herein-described trap comprising a cage having an entrance opening, a base upon which said cage is mounted, said base being extended to form a porch in front of the entrance opening, a door plate fulcrumed in front of the entrance opening with one end extending therein, means for automatically inclining the door plate to close the said opening upon the entrance of an animal into the cage, and bars secured in the porch on opposite sides of the door plate as and for the purpose set forth.

In testimony whereof I affix my signature in presence of two witnesses.

WILLIAM C. SMITH. [L. s.]

Witnesses:
T. M. EDMONDS,
R. R. GRANT.